(12) United States Patent
Rodrigues et al.

(10) Patent No.: US 11,012,024 B2
(45) Date of Patent: May 18, 2021

(54) ROOF INTEGRATED PHOTOVOLTAIC SYSTEM WITH IMPROVED SERVICEABILITY

(71) Applicant: BUILDING MATERIALS INVESTMENT CORPORATION, Dallas, TX (US)

(72) Inventors: Tommy F. Rodrigues, Nutley, NJ (US); David J. Gennrich, Fitchburg, WI (US); Nazar Dzoba, Edison, NJ (US); Lucas Masi, Parsippany, NJ (US); Daniel E. Boss, Morris Township, NJ (US); Sudhir Railkar, Wayne, NJ (US)

(73) Assignee: Building Materials Investment Corporation, Dallas, TX (US)

(*) Notice: Subject to any disclaimer, the term of this patent is extended or adjusted under 35 U.S.C. 154(b) by 0 days.

(21) Appl. No.: 16/438,830

(22) Filed: Jun. 12, 2019

(65) Prior Publication Data
US 2020/0014327 A1 Jan. 9, 2020

Related U.S. Application Data

(60) Provisional application No. 62/693,770, filed on Jul. 3, 2018, provisional application No. 62/739,724, filed on Oct. 1, 2018.

(51) Int. Cl.
*H02S 20/23* (2014.01)
*E04D 12/00* (2006.01)
(Continued)

(52) U.S. Cl.
CPC ............ *H02S 20/23* (2014.12); *E04D 12/006* (2013.01); *H02S 20/25* (2014.12); *H02S 30/00* (2013.01)

(58) Field of Classification Search
CPC ..... E04D 1/16; E04D 1/34; E04D 2001/3458; E04D 12/004; E04D 13/0445;
(Continued)

(56) References Cited

U.S. PATENT DOCUMENTS 4,636,577 A    1/1987  Peterpaul
5,642,596 A *  7/1997  Waddington .............. E04D 1/34
                                                          52/546
(Continued)

FOREIGN PATENT DOCUMENTS

CH    700095 A2 *  6/2010  ............. H02S 20/23
EP    2784241 A1 * 10/2014  ............. F24S 20/67
FR    2969190 A1 *  6/2012  ............. F24S 40/44

*Primary Examiner* — Ryan D Kwiecinski
(74) *Attorney, Agent, or Firm* — Womble Bond Dickinson (US) LLP

(57) ABSTRACT

A roof integrated photovoltaic mounting system includes a plurality of aluminum rails mountable in horizontal spaced relationship on a roof for receiving courses of photovoltaic panels or photovoltaic tiles. The PV panels or tiles have an extruded attachment feature along their forward edge portions that defines a downwardly projecting forwardly facing hook. Panels or tiles are installed by placing each panel or tile on a pair of rails and sliding the panel or tile down until its forward facing hook engages beneath a rear facing tongue on a rail below. A PV panel or tile in a next lower course is installed by slipping its rear edge beneath the forward edge of a panel or tile in a next higher course. The panel is then hinged down about its rear edge until its forward edge portion engages a support rail below. The panel is then slid down until the hook of its attachment fixture engages beneath the tongue of the downslope rail. When the entire array is installed in this manner, the forward edges of the panels are held down by the hook and tongue engagements and the rear edges are held down by being underneath the forward edges of panels in a next higher course. The (Continued)

procedure is reversed to remove a panel for servicing or replacement. In the case of solar glass tiles, water troughs are installed on the rails underlying abutting ends of tiles in a course to collect rainwater and direct it onto the upper surface of a tile in a next lower course.

8 Claims, 11 Drawing Sheets

(51) Int. Cl.
    *H02S 30/00* (2014.01)
    *H02S 20/25* (2014.01)

(58) Field of Classification Search
CPC ..... E04D 13/0481; H02S 20/23; H02S 20/25; H02S 30/10; F24S 2020/13; F24S 20/67; F24S 20/69; F24S 25/37; F24S 25/60; F24S 25/613; F24S 25/634; F24S 25/65; F24S 25/67; F24S 2025/6007; Y02B 10/12

See application file for complete search history.

(56) References Cited

U.S. PATENT DOCUMENTS

| | | | |
|---|---|---|---|
| 5,794,396 A * | 8/1998 | Gibbs | E04D 1/18 52/518 |
| 6,052,961 A * | 4/2000 | Gibbs | E04D 1/34 52/518 |
| 6,341,454 B1 | 1/2002 | Koleoglou | |
| 6,928,781 B2 | 8/2005 | Desbois et al. | |
| 7,155,870 B2 | 1/2007 | Almy | |
| 7,487,771 B1 | 2/2009 | Eiffert et al. | |
| 7,748,191 B2 | 7/2010 | Podirsky | |
| 9,577,571 B2 * | 2/2017 | Atia | F24S 25/33 |
| 9,605,432 B1 | 3/2017 | Robbins | |
| 9,831,818 B2 | 11/2017 | West | |
| 2007/0181174 A1 | 8/2007 | Ressler | |
| 2008/0035140 A1 | 2/2008 | Placer | |
| 2008/0315061 A1* | 12/2008 | Fath | F24S 25/632 248/510 |
| 2009/0019795 A1* | 1/2009 | Szacsvay | E04D 1/20 52/173.3 |
| 2009/0044850 A1 | 2/2009 | Kimberley | |
| 2011/0239555 A1 | 10/2011 | Cook et al. | |
| 2012/0260977 A1 | 10/2012 | Stancel | |
| 2016/0111995 A1* | 4/2016 | Nayar | F24S 25/613 211/41.1 |
| 2016/0134230 A1* | 5/2016 | Meine | H02S 20/23 52/698 |
| 2017/0063300 A1* | 3/2017 | Ash | F24S 25/61 |
| 2017/0155356 A1* | 6/2017 | Schuit | F24S 25/636 |
| 2017/0353144 A1* | 12/2017 | Guo | H02S 30/10 |
| 2018/0062571 A1* | 3/2018 | Ash | H01R 4/305 |
| 2018/0351502 A1 | 12/2018 | Almy et al. | |
| 2020/0169214 A1* | 5/2020 | Koch | H02S 20/23 |

* cited by examiner

ROOF INTEGRATED PHOTOVOLTAIC SYSTEM WITH IMPROVED SERVICEABILITY

REFERENCE TO RELATED APPLICATIONS

The benefit of the filing dates of U.S. provisional patent application 62/693,770 filed on Jul. 3, 2018 and U.S. provisional patent application 62/739,724 filed on Aug. 1, 2018, each entitled Roof Integrated Photovoltaic Mounting System with Improved Serviceability, is hereby claimed. The disclosures of these provisional patent applications are hereby incorporated by reference.

TECHNICAL FIELD

This disclosure relates generally to Roof Integrated Photovoltaic (RIPV) Systems and more particularly to RIPV systems including mounting structures for securing solar panels and solar tiles on the roof of a home.

BACKGROUND

Roof integrated photovoltaic (RIPV) solar energy systems generally include solar panels or solar tiles mounted on the roof of a home. RIPV systems are designed to prevent rainwater from passing through the system, thereby protecting the roof below. A downside, however, is that the mechanical mounting substructure below the panels or tiles is not readily accessible. Further, the perimeter of the photovoltaic array includes flashing that is highly integrated with the surrounding roofing materials to create a weatherized installation. Accordingly, if a Photovoltaic (PV) panel or tile of the array needs to be removed for repair or replacement (i.e. service), the integration with the roof must be undone to gain access to the mechanical mounting substructure below. This integration must be rebuilt when the replacement panel or tile is installed. This is very tedious and costly for contractors and homeowners.

A need exists for an RIPV system that, once installed on and integrated into a roof, allows a PV panel or tile to be replaced without the need to access and disassemble the mechanical mounting substructure below, without the need to disturb weatherization flashing around the perimeter of the installed array, and without tools. It is to the provision of such an RIPV system that the present invention is primarily directed.

SUMMARY

An RIPV system includes a plurality of PV panels or tiles designed to be installed on the roof of a home in courses. While larger PV panels and smaller PV tiles are encompassed by the invention, the terms "PV panels" and "photovoltaic panels" will be used herein to refer to both for the sake of clarity and brevity. Each PV panel of the system has a downslope or forward edge and an upslope or rear edge. In one embodiment, an extruded aluminum fixture or frame member is attached along the forward edges of the PV panels. The fixture is configured to define an overhang that projects forwardly from the top surface of the PV panel along its forward edge. The fixture also defines a forwardly extending front hook disposed beneath the overhang. The front hook is designed to slide beneath a rearwardly projecting tongue along the up-roof facing side of one of a plurality of spaced apart horizontal support rails previously installed on the roof. This forms a mechanical connection between fixture of the PV panel and the support rail that prevents the forward edges of PV panels or tiles from lifting up due to wind.

An upper course of side-by-side panels or tiles is installed in this way so that the forward edges of all the panels in the course are engaged with a support rail and prevented from lifting. To install a PV panel in a next lower course, the rear edge of the PV panel, which may also have a support extrusion or frame member attached thereto, is slid beneath the overhang along the forward edge of a PV panel above. The PV panel being installed is then hinged downwardly about its rear edge until the extruded fixture or frame member along its forward edge rests on a next lower support rail of the plurality of support rails. The PV panel being installed then need only be slid in a down-slope direction until the hook of its extruded fixture slides beneath the tongue of the support rail. Each panel of the next lower course of panels is thus installed and so on until the entire array of PV panels is in place.

When the array of panels is installed on a roof as described, the forward edges of all panels in each course of panels are held down because of the engagement of their hooks beneath the tongues of the support rails below. The rear edges of each panel in a course are held down because they are captured beneath the overhangs of panels in a next higher course of panels, which in turn are held down by the hooks and tongues of that course of panels. The perimeter edges of the installed array are then flashed and integrated with adjacent roofing shingles to prevent rainwater from leaking or flowing beneath the PV panels.

When it is desired or necessary to replace a PV panel of the RIPV array, no access to the support rails below the array is required. Instead, the affected panel is merely urged upwardly until the hook of its forward edge fixture slides from beneath the tongue of the rail below. The panel can then be hinged upwardly about its rear edge until its rear edge can be pulled from beneath the overhang of a next higher PV panel. Electrical connections are then disengaged and a new or repaired PV panel is installed by reversing the procedure.

Thus, an improved RIPV system is provided that successfully addresses the problems and shortcoming of the prior art. PV panels are easily serviced or replaced without the need to access mounting structures below, without undoing perimeter flashing, and without tools. These and other aspects, features, and advantages of the invention will become more apparent upon review of the detailed description presented below taken in conjunction with the accompanying drawing figures, which are briefly described as follows.

DETAILED DESCRIPTION

Figure 1:
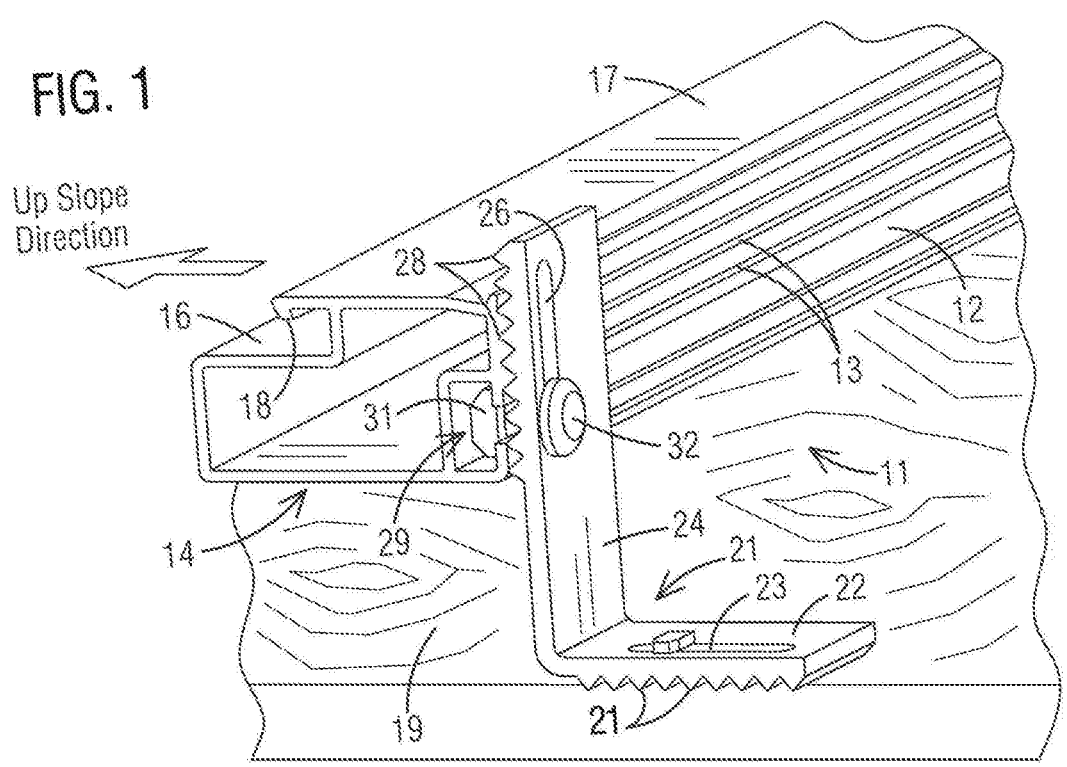
FIG. 1 is an isometric view of a section of an adjustable support rail that embodies principles of the invention in one preferred form.

Reference will now be made in more detail to the drawing figures, wherein reference numerals identify parts and components throughout the several views. FIG. 1 shows a section of a support rail assembly that embodies principles of the invention. During installation of the system of this invention, several of these support rails are fixed to the roof of a house extending horizontally across the roof and in spaced parallel relationship. PV panels are then mounted to the rails as detailed below. The support rail assembly 11 includes, in this embodiment, an extruded aluminum rail 12 that is attached to a roof deck 19 with mounting brackets 21. The main body 14 of the rail 12 is profiled to define a ledge 16 and a rearwardly projecting tongue 17 along its up-slope edge. A plurality of ratchet teeth 13 and a T-slot 29 extend along the down-slope edge of the rail 12.

The mounting brackets 21 are L-shaped in this embodiment and include a foot 22 having an elongated slot 23 and a stanchion 24 having an elongated slot 26. The up-slope side of the stanchion 24 is formed with horizontal ratchet teeth 28 sized to mesh with the ratchet teeth 13 of the rail 12. The bottom side of the foot 22 also has similar ratchet teeth. Mounting brackets 21 are secured to the rails with a bolt 32 extending through the slot 26 and into the T-slot 29. Nuts 31 slide within the T-slot to allow selective positioning of a mounting bracket along the rail. The bolt 32 is then tightened to secure the mounting brackets 21 to the rail 12.

The ratchet teeth 13 on the rail and the ratchet teeth 28 on the stanchion 24 allow the rail to be adjusted up or down relative to the roof deck as needed at each mounting bracket. Appropriate adjustments insure that the rail is level along the roof deck 19 even if the roof deck varies from level. In this way, roof sag can be compensated. Also, the foot 22 is shorter than the stanchion 24 so that the mounting bracket 21 can be reversed if a rail needs to be lowered more than is possible with the longer stanchion 24. When reversed, the stanchion 24 becomes the foot and the foot becomes the stanchion. The mounting brackets 21 are secured to the roof deck 19 with lag bolts or other fasteners extending through the slot 23 and threaded into the roof deck 19.

With a plurality of rail assemblies 11 secured to a roof deck extending horizontally and in spaced parallel relationship, PV panels can be mounted to the rail assemblies without the need for tools. More specifically, and with reference to FIGS. 2, 3, and 4, each PV panel 36 in one embodiment has an extruded aluminum frame member 37 attached to and extending along its forward edge. In the illustrated embodiment, the frame member 37 is profiled with a slot 38 that receives the forward edge of a PV panel 36. An overhang 39 of the frame member extends forwardly from the top side of the PV panel 36. The frame member 37 is further profiled to define a forwardly extending hook 44 that is located below the overhang 39 and inboard of its forward edge. A second extruded aluminum frame member 41 is attached to and extends along the rear edge of each PV panel 36 as shown.

Figure 2:
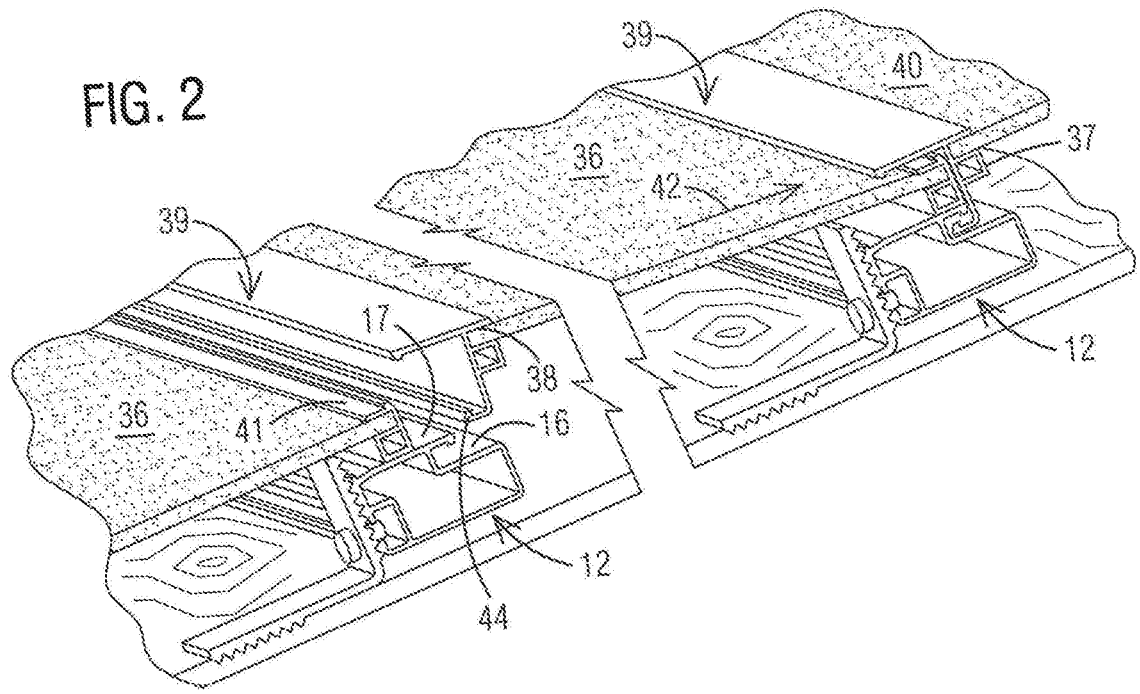
FIG. 2 is an isometric view showing a first step of the installation of a PV panel within an array of panels according to principles of the invention.
Figure 3:
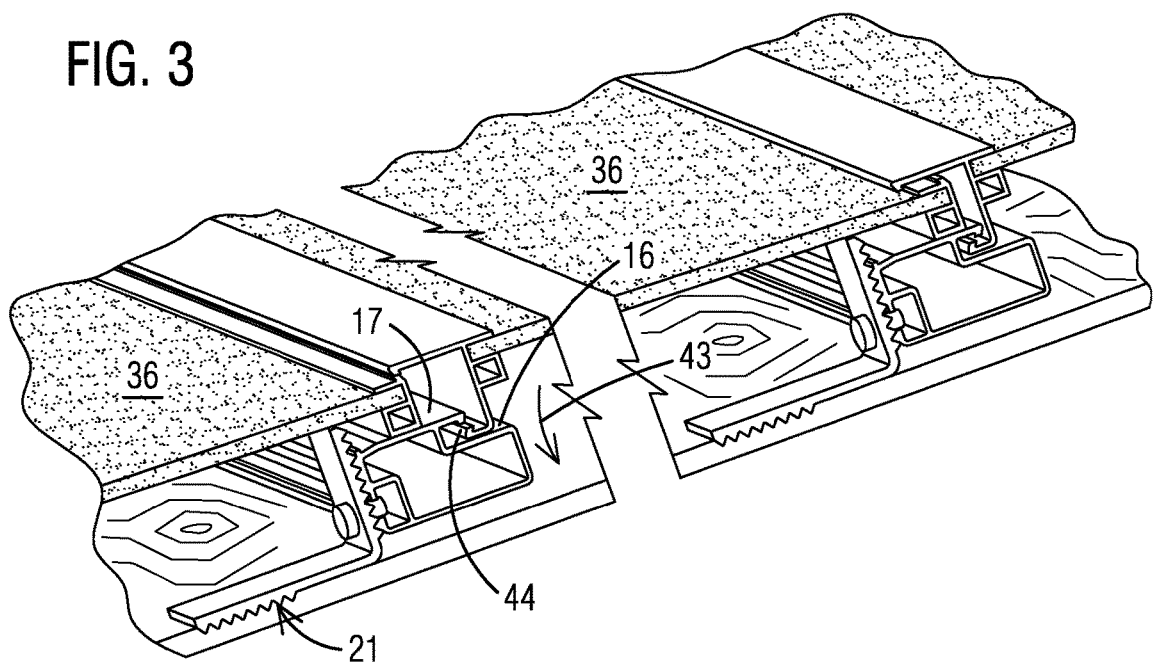
FIG. 3 is an isometric view showing a second step of the installation of the PV panel within the array.
Figure 4:
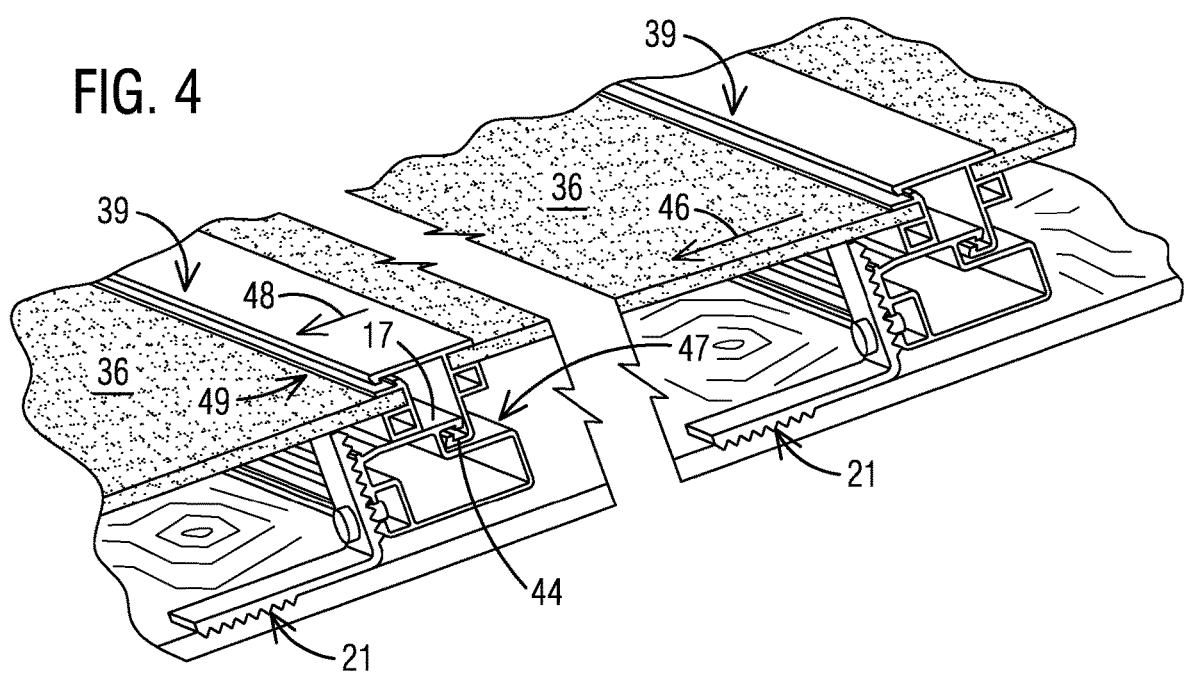
FIG. 4 is an isometric view showing a third step of the installation of the PV panel within the array.

FIG. 2 illustrates the first step for installing a PV panel onto the support rails 12 mounted to the roof deck. Specifically, the rear edge of a PV panel and its rear fixture or frame member 41 are first slid upwardly (as indicated at 42) beneath the overhang 39 of an upslope PV panel 40 until the fixture or frame member 41 engages the back wall of frame member 37. Then, as illustrated in FIG. 3, the forward edge of the PV panel is pivoted downwardly as indicated at 43 until the hook 44 rests on the ledge 16 of one of a support rail 12 below. Finally, as illustrated in FIG. 4, the PV panel 36 is slid downwardly as indicated at 46 and 48. This causes the hook 44 of the frame member 37 to move beneath the tongue 17 of the rail 12. This, in turn, secures the forward edge of the PV panel to the rail and prevents the forward edge from being lifted up by wind.

During this installation process, the rear fixture or frame member 41 of the PV panel comes to rest beneath the overhang 39 of the fixture along the forward edge of a next higher PV panel. The forward edge of this next higher PV panel likewise is secured against lifting by its hook 44 being engaged beneath the tongue 17 of the rail below. Accordingly, the rear edge of the PV panel just installed is prevented from lifting due to wind by being disposed beneath the overhang 39. The entire array of PV panels is installed onto the support rails in this way with each PV panel of the array being secured against wind lift by the interaction of the hooks 44 and tongues 17. As a part of the installation of each PV panel, electrical wiring of the PV panel is connected through electrical couplers to electrical wiring of neighboring PV panels to couple the PV panels together electrically.

A PV panel of the array can be removed for servicing or replacement very easily and without the need for tools, without removing perimeter flashing, and without the need to access the mounting structures (i.e. the rails and mounting brackets) below. If service is needed, the installation steps described above are simply reversed. First, the PV panel is urged in the up-roof direction sliding it upwardly until the hook of its forward edge fixture disengages from the tongue of the rail below. The PV panel can then be pivoted upwardly about is rear edge and moved in the down-roof direction until its rear edge disengages from beneath the overhang of a next higher PV panel. Electrical connections are then disengaged by pulling electrical couplers apart and the PV panel is free to be removed from the array.

Figure 5A:
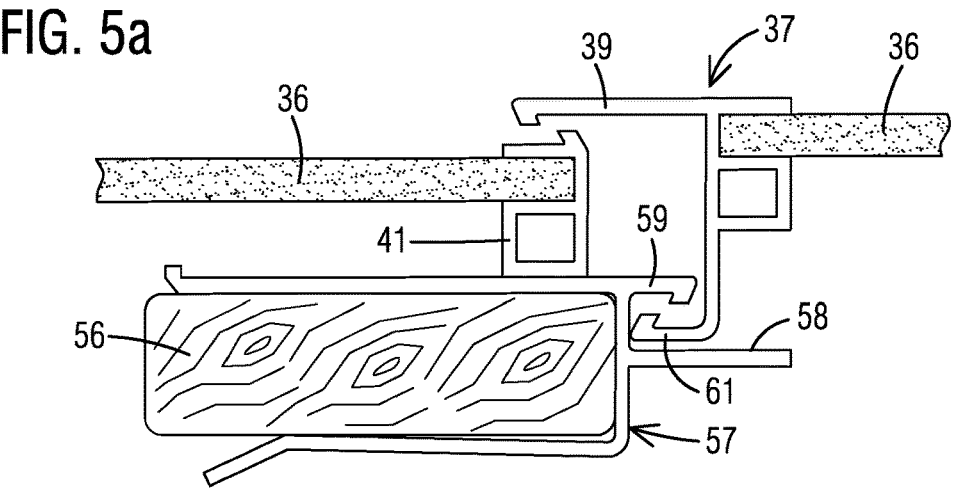
FIGS. 5a-5c illustrate an alternate embodiment of the PV panel mounting system using wooden battens and attached rail clips according to another embodiment of the invention.
Figure 5B:
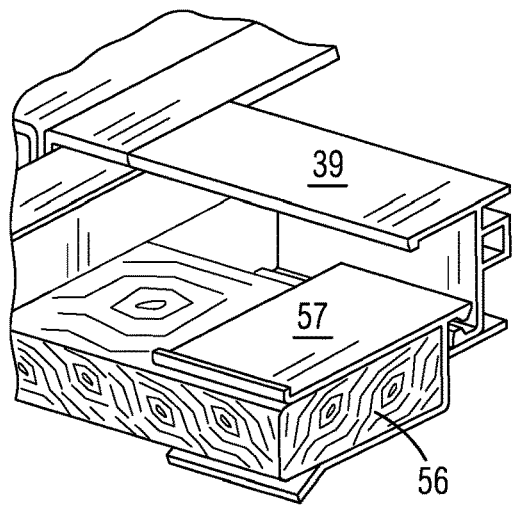
Figure 5C:
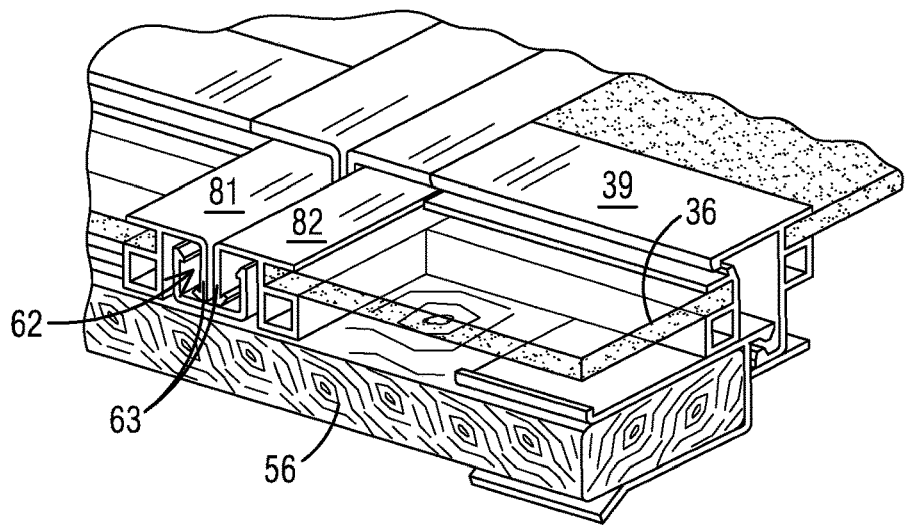

FIGS. 5a, 5b, and 5c illustrate an alternate embodiment of the invention that makes use of wooden battens attached to a roof deck rather than extruded aluminum rails. A plurality of wooden battens 56 are attached to the roof deck in horizontally extending spaced parallel relationships. Metal clips 57 are secured to the wooden battens. Each metal clip defines a ledge 58 and an up-slope facing tongue 59. The metal clips 57 are attached at spaced intervals along the wooden battens. Installation of PV panels with this embodiment is essentially the same as with the previously described embodiment. The rear edge of a PV panel is slid beneath the overhang of a next higher PV panel. The PV panel is then pivoted down and slid in a down-slope direction until its hook 61 engages beneath the tongues 59 of the metal clips. At the same time, the rear edge of the PV panel becomes captured beneath the overhang 39 of a next higher PV panel.

FIG. 5c further illustrates one embodiment of a water management structures at the juxtaposed side edges of two side-by-side PV panels. A U-shaped water management trough 62 extends beneath the abutting side edges of the panels. The side edges of each PV panel are provided with fixtures or frame members 81, 82 attached to and extending along the edges of the panels. Each fixture or frame member 81, 82 has a downwardly projecting flashing 63 that extends into the water management trough 62 below. Rainwater that may leak between the two downwardly projecting flashings is captured within the trough and drained downwardly to the forward edge of the PV panel array to be shed by the shingles in lower courses.

Figure 6:
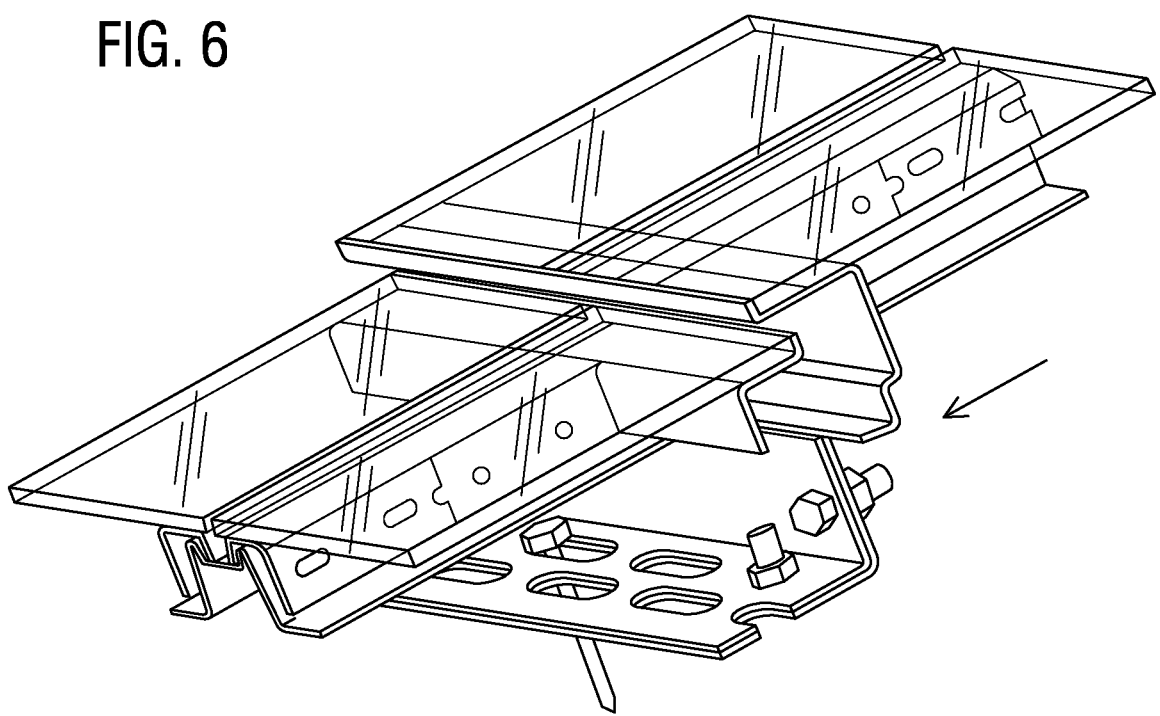
FIG. 6 is an isometric view showing an alternate embodiment of a mounting system of the invention.

FIG. 6 illustrates another embodiment wherein some or all of the hardware is made of rolled or formed (roll formed) sheet metal rather than wood or extruded aluminum. The PV panel frames are made of roll formed sheet metal as is the mounting hardware below that supports PV panels on a roof deck. All of the metal parts of the system can be roll formed sheet metal in this embodiment. Alternatively, a hybrid system can be made with the PV panels, for example, having extruded aluminum frames and the mounting hardware below being made of roll formed sheet metal.

Figure 7:
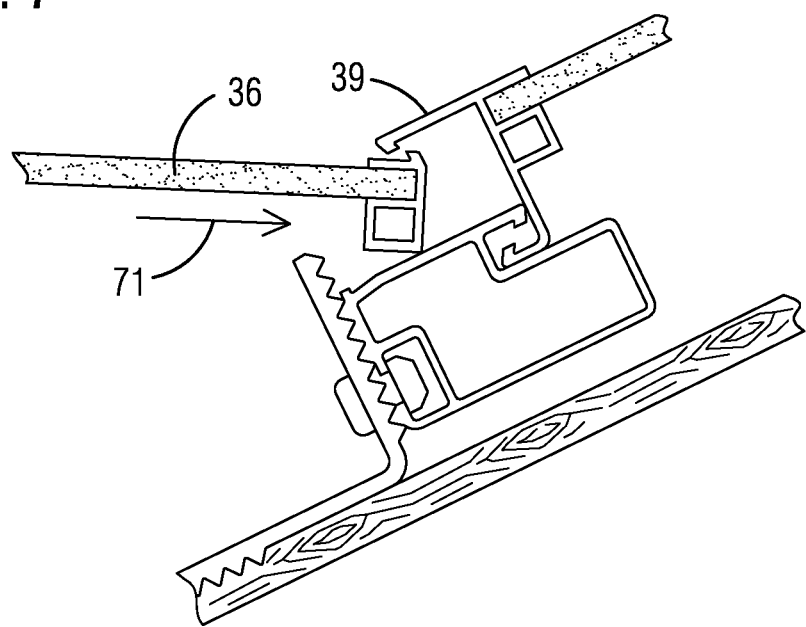
FIG. 7 is an end elevational view showing a first step of the installation of a PV panel according to the invention.
Figure 8:
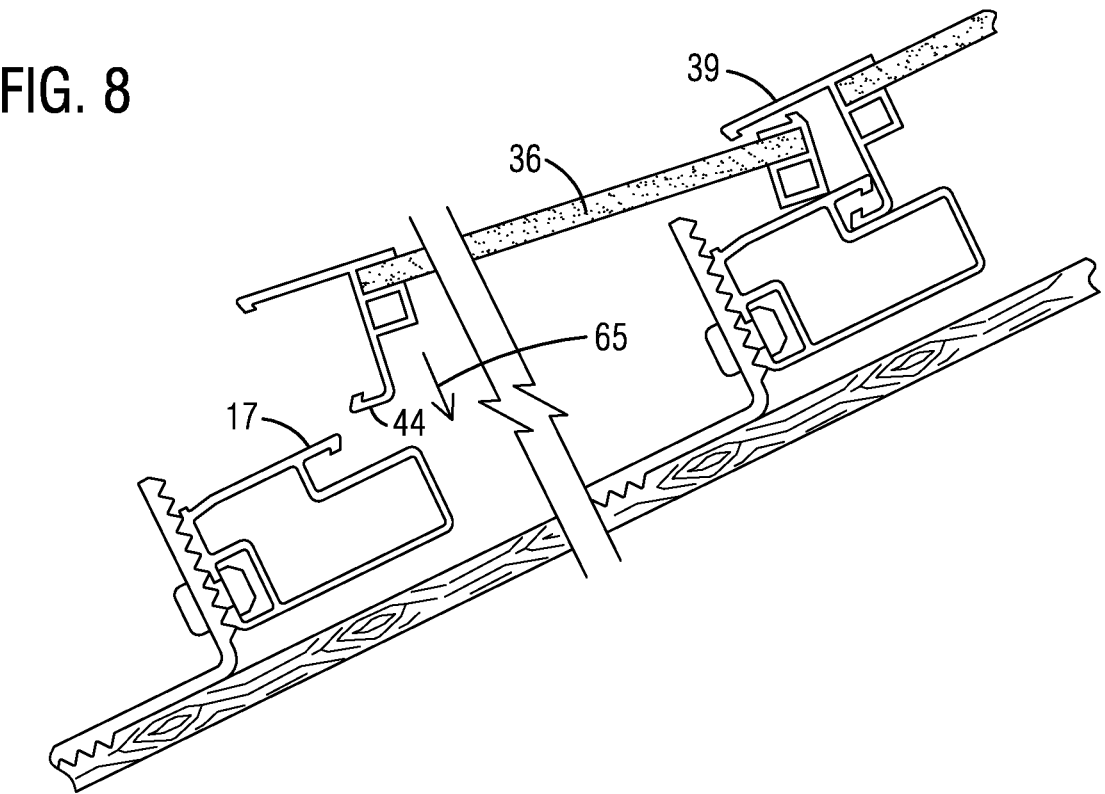
FIG. 8 is an end elevational view showing a second step of the installation of a PV panel.
Figure 9:
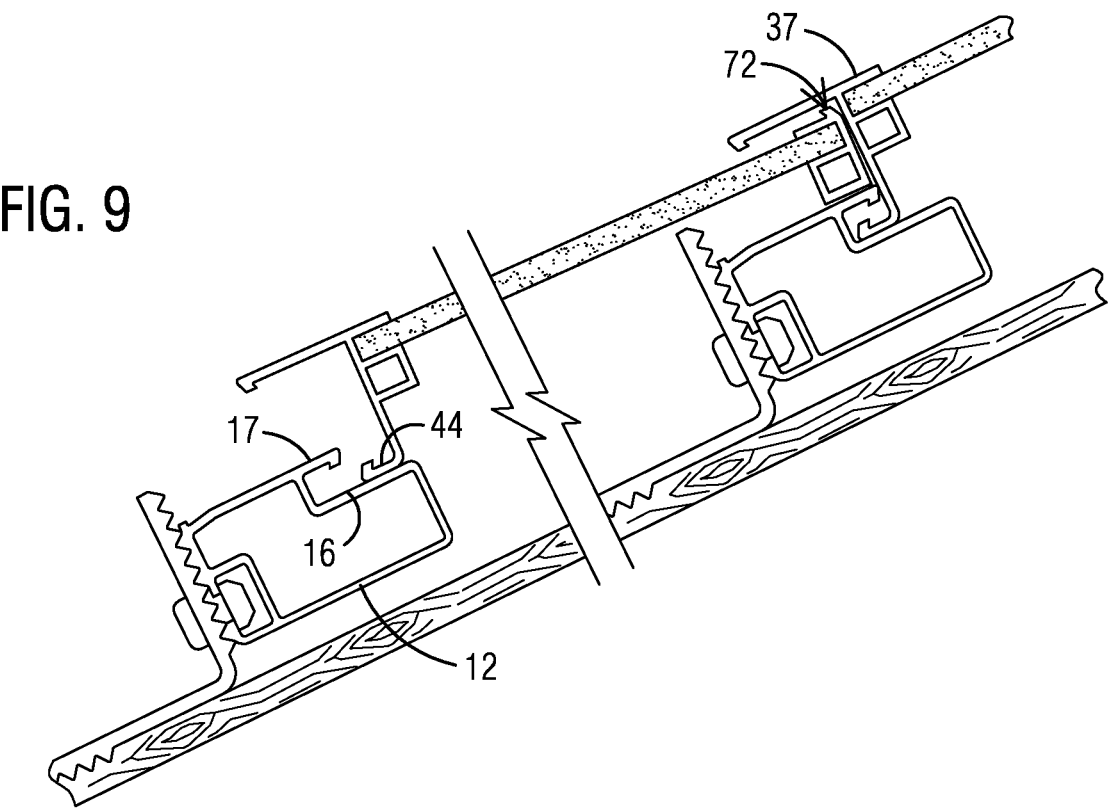
FIG. 9 is an end elevational view showing a third step of the installation of a PV panel.
Figure 10:
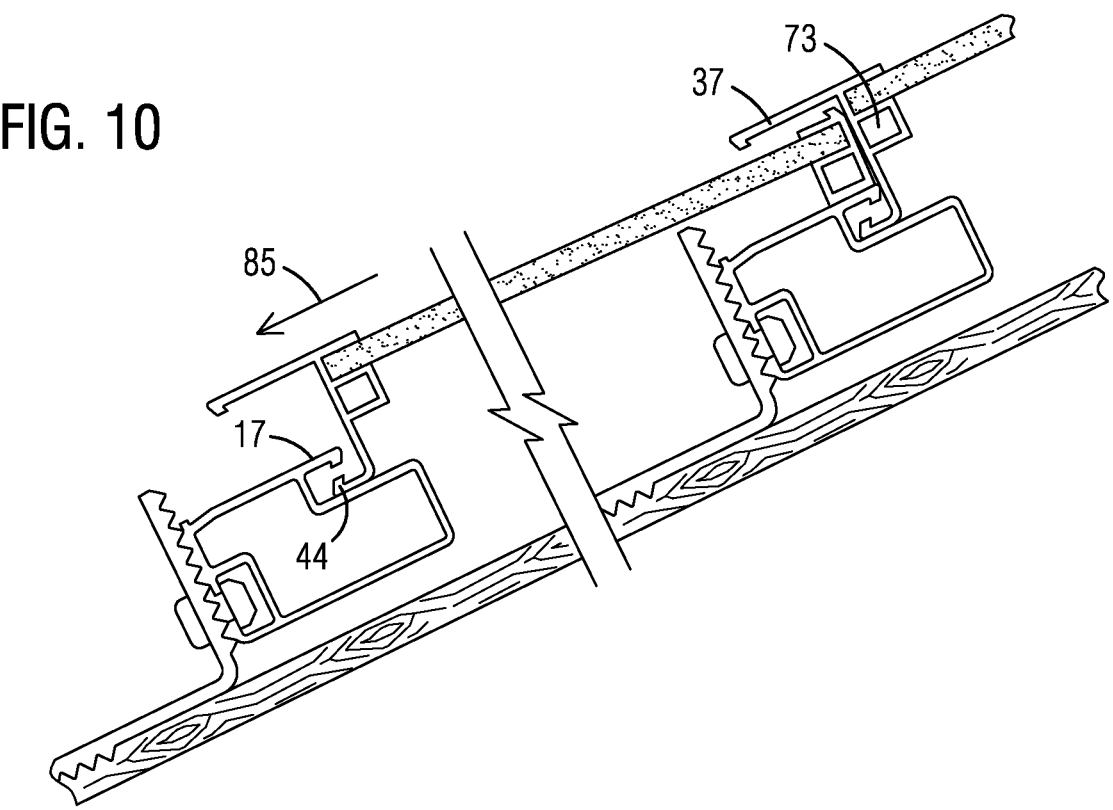
FIG. 10 is an end elevational view showing a fourth step of the installation of a PV panel.
Figure 11:
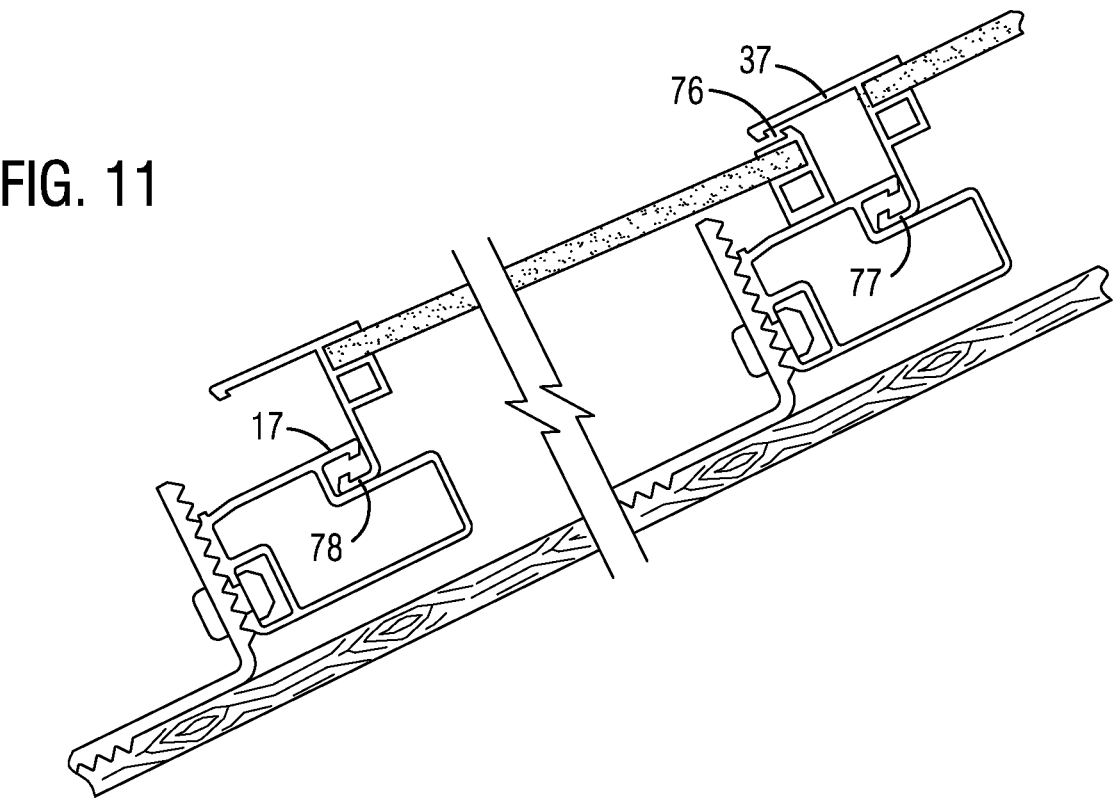
FIG. 11 is an end elevational view showing the final step of the installation of a PV panel.

FIGS. 7-11 show the steps for installing a PV panel in a side elevational view that perhaps is more informative. In FIG. 7, the rear edge of a PV panel 36 is shown being slid in the direction of arrow 71 beneath the overhang 39 of a previously installed PV panel in a next higher course. In FIG. 8, the rear edge of the PV panel 36 is slid further beneath the overhang 39 and the PV panel is beginning to be pivoted downwardly about its rear edge as indicated at 65. In FIG. 9, the rear edge of the PV panel is slid up against the inside wall of the fixture 37 and is completely pivoted downwardly with the hook 44 along its forward edge resting on the ledge 16 of rail 12. In FIG. 10, the PV panel 36 is beginning to be slid in a down-slope direction as indicated at 85. The rear edge of the PV panel is beginning to separate from the inside wall of the fixture 37 as shown at 73. Further, the hook 44 is beginning to move beneath the tongue 17 of the support rail at the forward edge of the PV panel. Finally, FIG. 11 shows the PV panel fully installed with its hook 78 captured completely beneath tongue 17 of the downslope rail and its rear edge captured beneath overhang 37 of panels in a next higher course as shown at 76.

Figure 12:
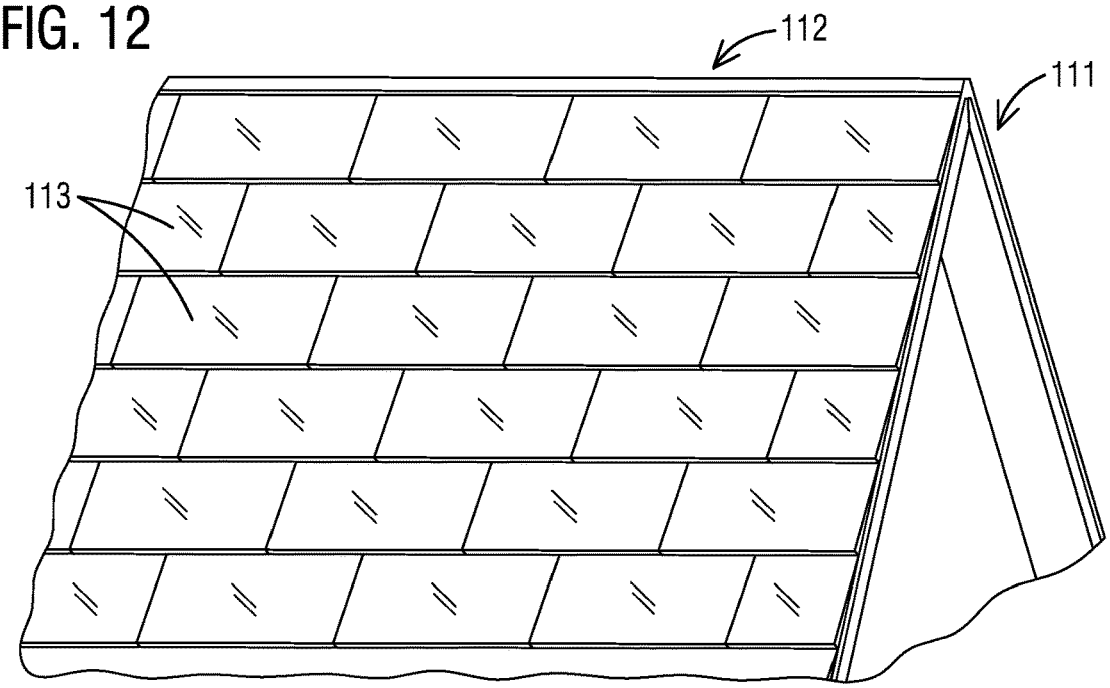
FIG. 12 is a perspective view showing solar glass tiles installed on a roof according to a second embodiment of the invention.

FIGS. 12-21 illustrate an alternate embodiment of the present invention wherein solar glass tiles with no edge frames or edge fixtures are mounted to a roof using a parallel rail mounting system. These figures will be referenced individually. FIG. 12 shows a portion of a home 111 having a roof 112. The roof 112 is shingled with solar glass tiles 113 mounted to the roof according to aspects of the invention. The solar glass tiles have no edge treatments, i.e. no edge fixtures or frame members, and so resemble traditional slate shingles when viewed casually.

Figure 13:
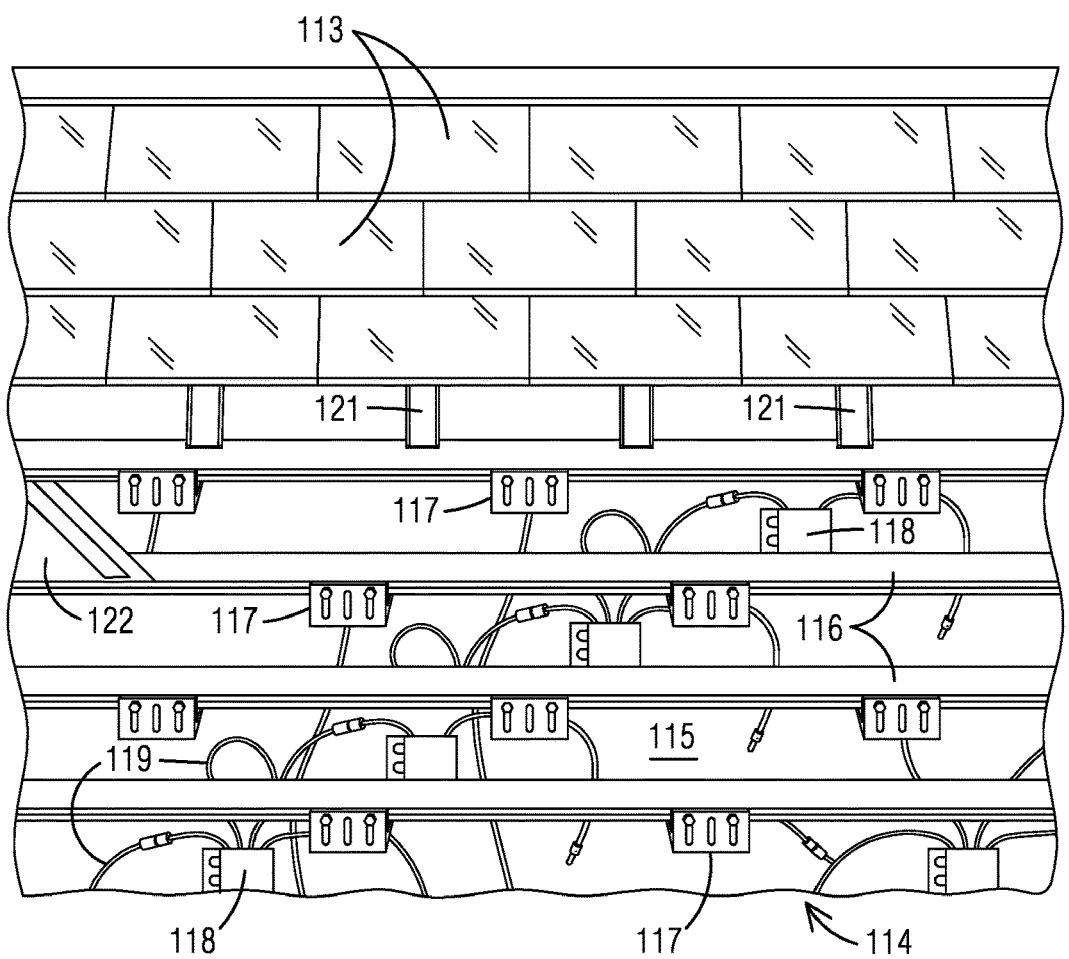
FIG. 13 is a perspective view showing a rail system according to the invention secured to a roof deck with some solar glass tiles already attached to the rail system.

FIG. 13 shows another section of the roof 112 and illustrates a solar glass tile mounting system according to aspects of the invention. The mounting system comprises a plurality of support rails 116 secured to the roof deck 115 in horizontally extending spaced parallel relationship. Each of the support rails 116 is attached to a bracket 117 that, in turn, is secured to the roof deck with lag bolts or other appropriate fasteners. As mentioned above, the support rails can be vertically adjusted on the mounting brackets so that the rails can be leveled to compensate for sagging roof decks and other abnormalities. Thus, the support rails are level and lie in a plane above the roof deck.

Solar glass tiles 113 are secured to the underlying rails 116 as described in more detail below and a ventilation space is defined between the glass tiles and the roof deck. The space accommodates electronics modules 118 and wiring 119 and provides for convective cooling of the solar glass tiles and other components in the space. Water troughs 121 are installed beneath the abutting side edges of solar glass tiles in a course. The water troughs 121 contains and drains rainwater that may seep between abutting side edges of the tiles, also as detailed below. Valley flashing 122 is installed along the valleys of the roof to collect rainwater from the solar glass tiles where roof sections meet and direct the water off the roof.

Figure 14:
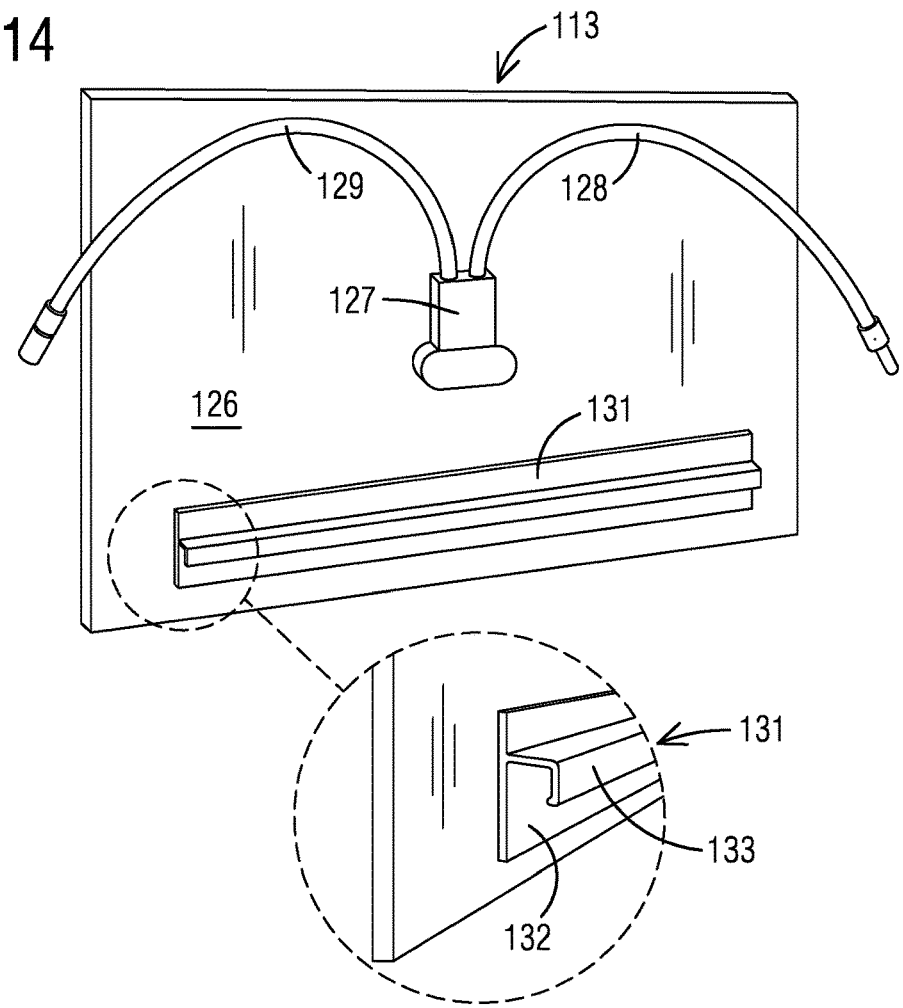
FIG. 14 shows the back side of a solar glass tile according to principles of the second embodiment of the invention.

FIG. 14 shows the underside of a solar glass tile of the system. The solar glass tile 113 has an underside surface 126 to which a junction box 127 is attached. Wiring 128 and 129 carries electrical energy produced by the tile to energy management electronics and these cables terminate in electrical connectors. An attachment structure 131 is secured to the underside surface of the tile and extends along and inboard of the forward edge of the solar glass tile 113. As shown in the inset, the attachment structure 131, which preferably is made of extruded aluminum, is profiled with a base 132 that is fixed to the underside of the tile with an appropriate adhesive and a downwardly and forwardly extending hook 133 for engaging a rail 116.

Figure 15:
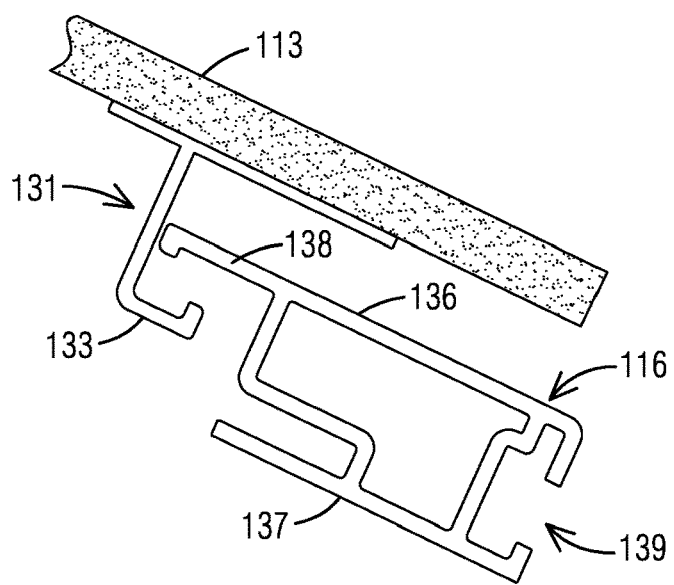
FIG. 15 is an end elevational view illustrating the hook of a solar glass tile engaged beneath the tongue of an underlying rail to secure the forward edge of the solar glass tile against rising.

FIG. 15 illustrates the engagement of the attachment structure 131 with a rail 116 of the mounting system. As with the first embodiment above, the tile is slid in a downslope direction on a pair of rails until the base 132 rests on the top of the downslope rail and the hook 133 engages below the projecting tongue 138 of the rail. In this way, the forward edge portion of the tile is secured and prevented from being lifted by wind. In this respect, the solar glass tile of this embodiment is similar to the PV panel of the first embodiment. However, there is no fixture or frame member along the forward edge of the solar glass tile that defines an overhang and a hook. The hook is instead formed as a part of the attachment structure 131 secured to the underside of the solar glass tile.

Figure 16:
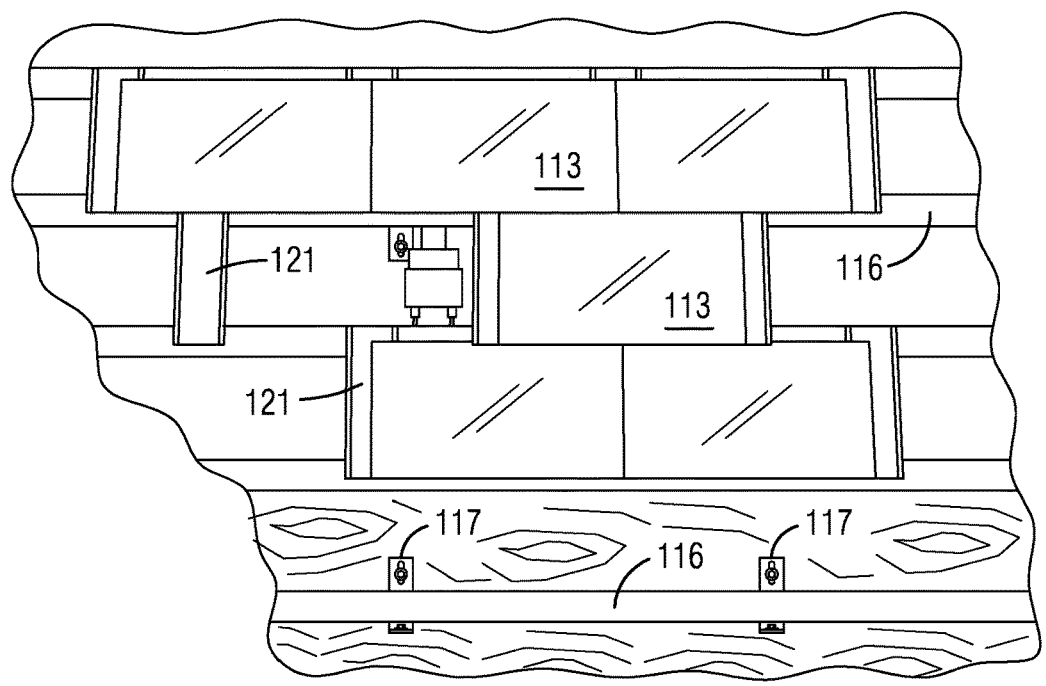
FIG. 16 is a top plan view of a partial installation of a solar glass tile system showing parallel mounting rails, water troughs, and solar glass tiles secured to the rails in courses.
Figure 17:
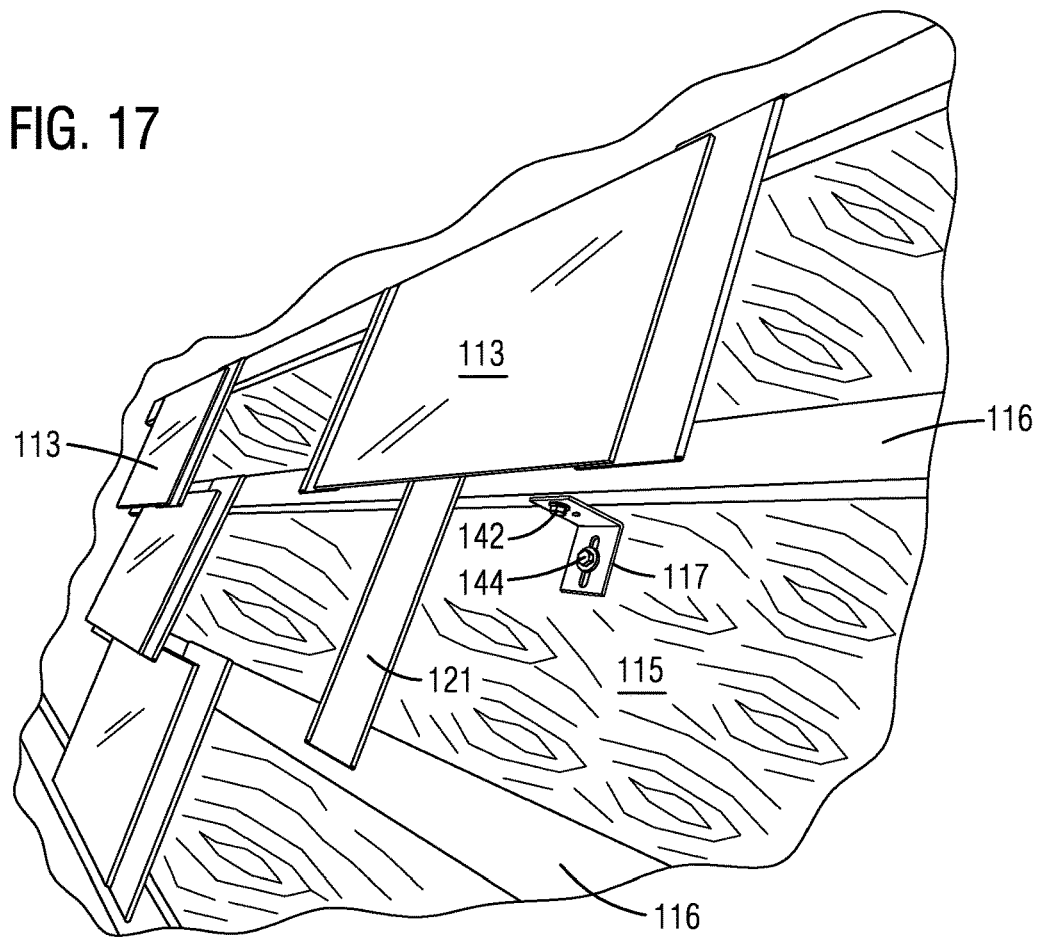
FIG. 17 is a perspective view of a partial installation of a solar glass tile system showing the relationship between the solar glass tiles and the water troughs.

FIGS. 16 and 17 show a partial installation of solar glass tiles using the mounting system of this embodiment and also illustrate water management features of the installation. Solar glass tiles 113 are arranged in courses and secured to the rails 116 as described above with the hooks of their attachment features engaged below the tongues of downslope rails. The side edges of tiles in each course simply abut one another, which can allow rainwater to seep between the abutting edges. Water troughs 121 are installed on the rail system as detailed below and are arranged to underlie the abutting side edges of two solar glass tiles in a course. Rainwater that may seep between the abutting edges is collected by the water troughs and directed onto the top surface of a solar glass tile in the next lower course. Since the solar glass tiles in a course are staggered relative to the tiles in a next higher (and lower) course, the water cascades completely down the roof to the eave and off of the roof. The water troughs have upwardly and inwardly hemmed side edges to contain collected water as it is channeled away.

Figure 18:
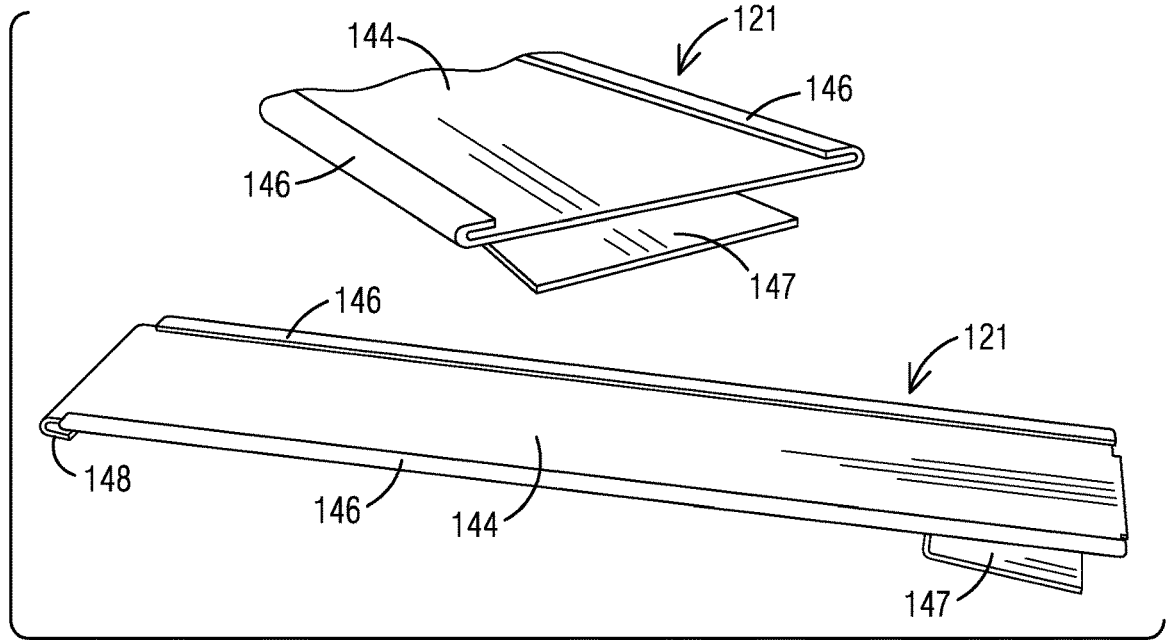
FIG. 18 includes two perspective views of an embodiment of the water troughs of the second embodiment.

FIG. 18 shows more details of the preferred embodiment of the water troughs of the invention. Each water trough 121 preferably is made of aluminum or other corrosion resistant metal or plastic and is configured as an elongated rectangle with a floor 144. The side edges 146 of each water trough are bent up and over to form a hem that confines water to the floor of the trough. A hook 148 is formed on the upslope end of each water trough and a forwardly extending flange 147 is located on the bottom of each water trough near its downslope end.

To install a water trough on the support rail system of the invention, the water trough is positioned across two adjacent rails and positioned so that it will underlie abutting edges of two adjacent solar glass tiles. The trough is then slid in an upslope direction until its hook 148 drops behind the tongue 138 of the upslope rail. The trough is then slid in a downslope direction, which engages its hook 148 beneath the rearwardly facing tongue of the upslope support rail.

At the same time, the forwardly extending flange 147 rests atop the downslope rail and functions to space the water trough above the downslope rail. In this way, each water trough 121 is secured at its top end to the upslope rail of the support rail system. The bottom end of each water trough is raised up from the downslope rail to form a space into which solar glass tiles of a next lower course can be slid. Solar glass tiles are then installed on the rails as described above with their abutting ends overlying the water troughs. If needed, the water troughs can be slid easily along the rails to desired locations beneath the tile edges.

The flange of each water trough resting on the downslope rail is configured to provide a space between the bottom of the water trough and the rail. When a solar glass tile of a next lower course is installed in staggered relationship with the tiles of the upper course, its upslope edge is slid into the space defined by the flange of the water trough. Thus, the downslope end of the water trough becomes hooked onto the upslope edge of the solar glass tile. Water collected by each water trough in a course is contained and channeled onto the upper exposed surface of the next lower solar glass tile. An entire installation is therefore water tight and protects the roof deck below from water damage.

Figure 19:
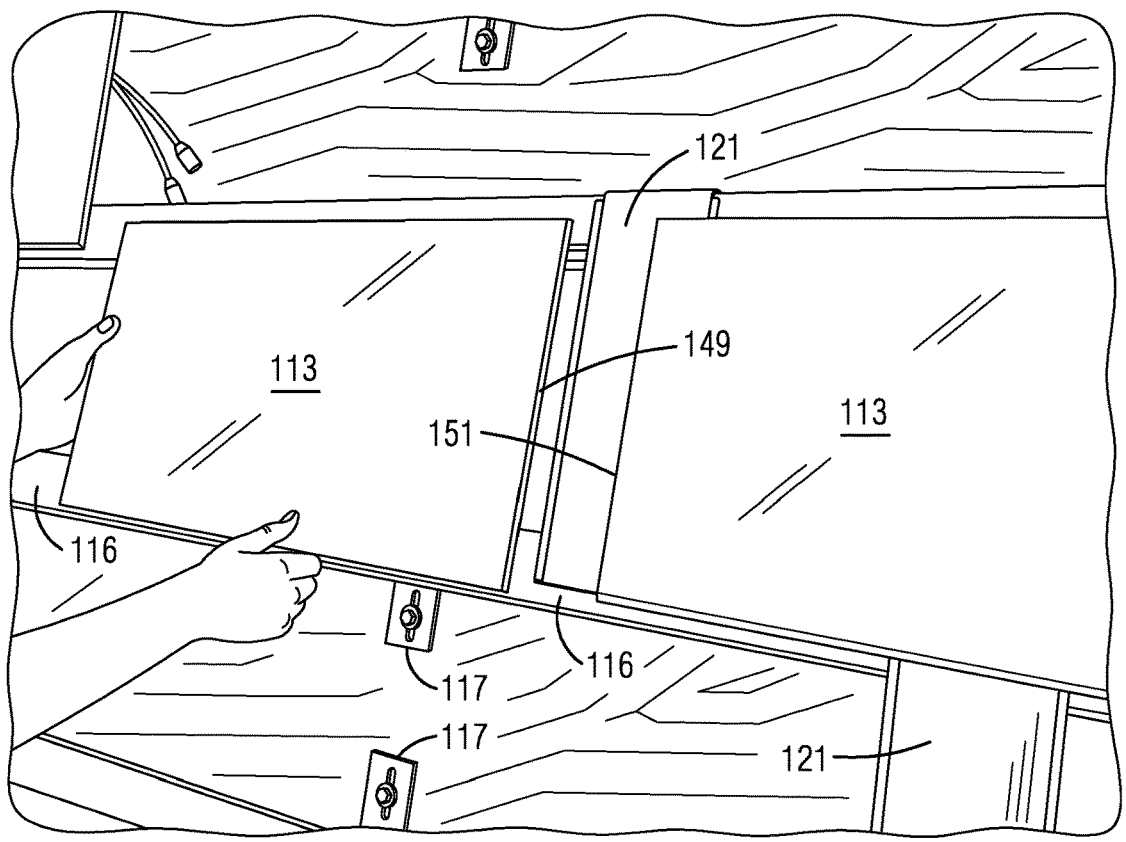
FIG. 19 is a perspective view showing installation of a solar glass tile next to a previously installed tile with the abutting ends of the tiles overlying a water trough below.

FIG. 19 shows a solar glass tile of a course being installed on the rail mounting system with its side edge 149 abutting the side edge 151 of an adjacent tile in the course. The abutting side edges overlie a water trough 121 previously installed on the rails.

Figure 20:
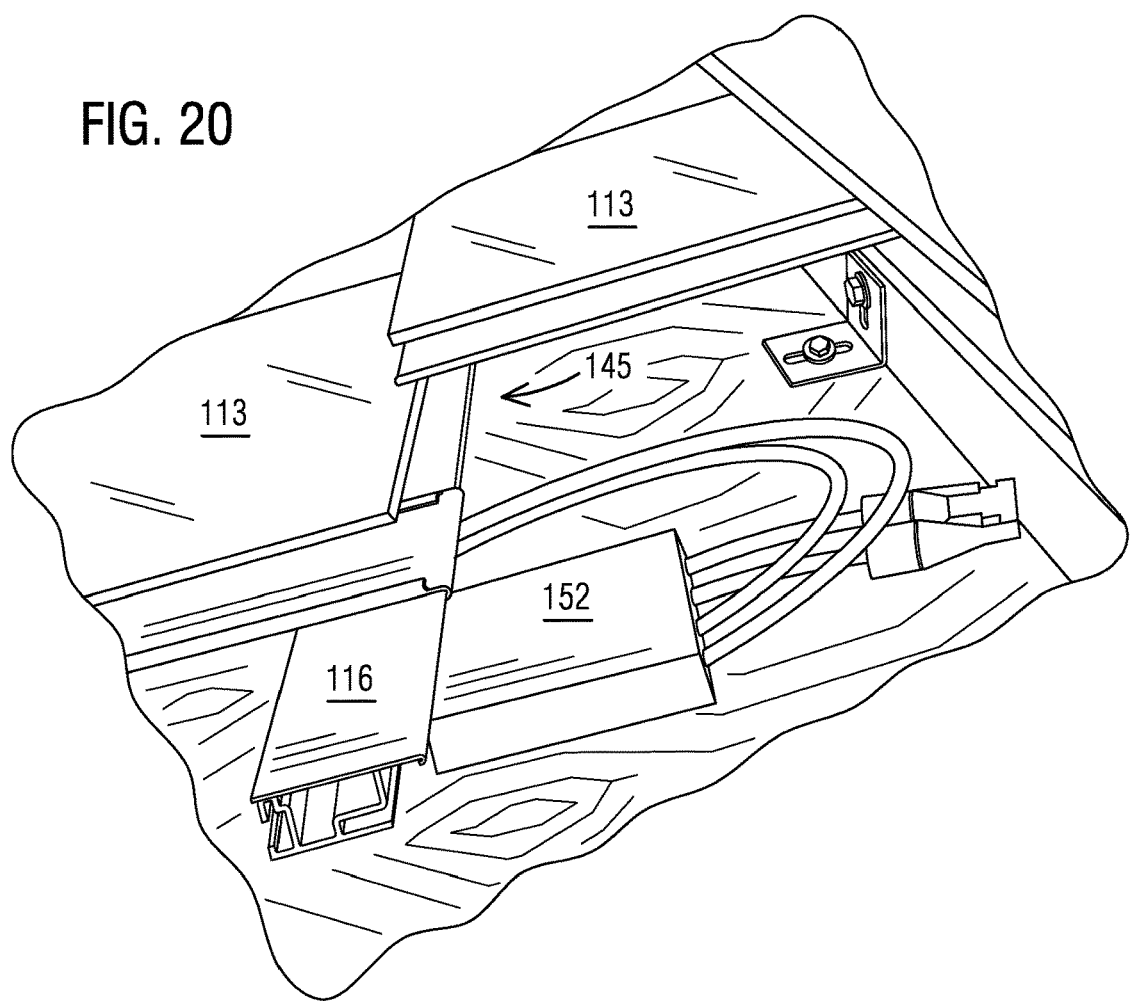
FIG. 20 is a perspective view showing one technique for attaching support electronics along the up-slope edges of support rails according to the invention.
Figure 21:
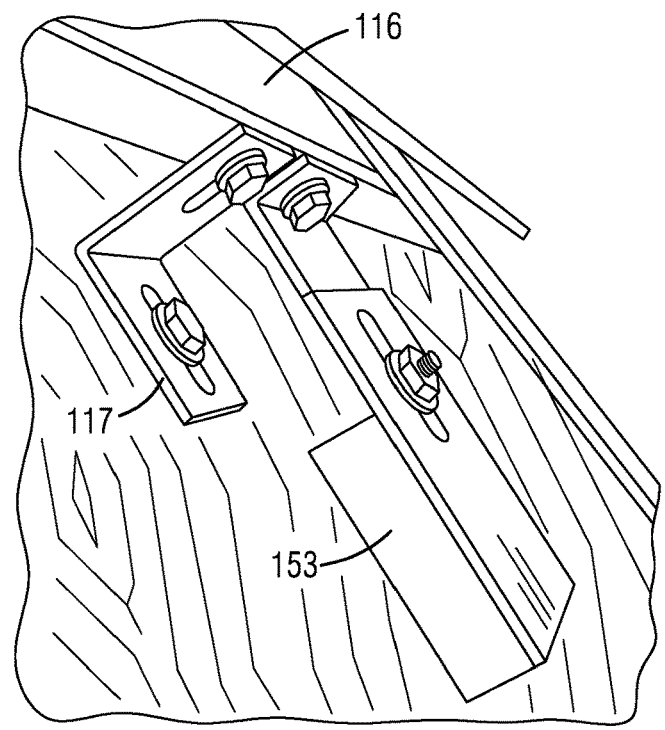
FIG. 21 is a perspective view showing one technique for attaching support electronics along the down-slope edges of support rails according to the invention

FIG. 20 illustrates one possible way to incorporate energy management electronics such as micro inverters, DC optimizers, or smart controllers into the system of the invention. Here, an energy management module 152 is shown attached to the upslope edge of one of the rails 116 of the system so that it resides beneath solar glass tiles above. In FIG. 21, an energy management module 153 is shown mounted to the T-slot along the downslope edge of a rail with a T-nut and bolt. Other ways of incorporating energy management electronics also are possible. The energy management modules preferably are mounted such that they reside above the roof deck and within the space between the roof deck and tiles. In this way, more than adequate ventilation is provided to keep the electronics and the tiles cool.

The invention has been described herein in terms of preferred embodiments and methodologies considered by the inventors to represent the best modes of carrying out the invention. It will be apparent to the skilled artisan, however, that a wide gamut of additions, deletions, and modifications, both subtle and gross, might well be made to the illustrated embodiments without departing from the spirit and scope of the invention itself, which is delineated only by the claims.

What is claimed is:

1. A roof integrated photovoltaic system comprising:
a plurality of support rails mountable on a roof deck in spaced apart relationship with each rail extending substantially horizontally across the roof deck;
an upslope facing edge of each support rail having at least one first engagement feature;
a plurality of photovoltaic panels each having an upslope edge, a downslope edge, a right side edge, a left side edge, an upper surface for exposure to sunlight, and an underside;
the plurality of photovoltaic panels being installable on the plurality of support rails in courses with the downslope edges of photovoltaic panels in one course overlapping the upslope edges of photovoltaic panels in a next lower course and with the left side edge of each photovoltaic panel in a course abutting the right side edge of an adjacent panel in the course;
wherein the photovoltaic panels of one course are staggered with respect to photovoltaic panels in the next lower course;
a structure extending along the underside of each photovoltaic panel adjacent the downslope edge thereof;
at least one second engagement feature on the structure, the at least one second engagement feature configured to interlock with the first engagement feature of a downslope support rail when a photovoltaic panel is positioned on an upslope support rail and a downslope support rail and slid in a downslope direction;
wherein the first engagement feature comprises a upslope facing tongue and the at least one second engagement feature comprises a downslope facing hook configured to move beneath and thereby interlock with the upslope facing tongue; and
water troughs positioned beneath the abutting side edges of each pair of photovoltaic panels;
wherein each water trough configured to: (i) collect water that seeps between the abutting side edges of each pair of photovoltaic panels and (ii) direct the water onto a top surface of a photovoltaic panel in the next lower course;
whereby the downslope edge of each photovoltaic panel in one course is secured to the downslope rail on which it rests and the upslope edge of each panel is secured by the overlapping downslope edges of photovoltaic panels in a next higher course.

2. A roof integrated photovoltaic system as claimed in claim 1 wherein the support rails are formed of extruded aluminum.

3. A roof integrated photovoltaic system as claimed in claim 2 wherein the at least one engagement feature is part of the extruded aluminum support rails.

4. A roof integrated photovoltaic system as claimed in claim 1 further comprising brackets mountable to a deck of the roof, the plurality of support rails being mounted to the brackets.

5. A roof integrated photovoltaic system as claimed in claim 4 wherein the support rails are adjustably mountable to the brackets so that the support rails can be leveled.

6. A roof integrated photovoltaic system as claimed in claim 1 further comprising a water management trough extending beneath the abutting edges of adjacent photovoltaic panels, the left side edge and the right side edge of the photovoltaic panels comprising flashing that extends into the water management trough.

7. A roof integrated photovoltaic system as claimed in claim 1 wherein the structure extending along the underside of each photovoltaic panel comprises a frame member attached to the downslope edge of the photovoltaic panel, the frame member being profiled to define the structure extending along the underside of each photovoltaic panel.

8. A roof integrated photovoltaic system as claimed in claim 1 wherein the structure extending along the underside of each photovoltaic panel is adhered to the underside of each panel with adhesive.

* * * * *